United States Patent Office 2,766,172
Patented Oct. 9, 1956

2,766,172

INSECTICIDALLY ACTIVE S-(POLYCHLORO-TETRAHYDROPYRANYL) - O,O-DIETHYLDI-THIOPHOSPHATE

Rhoads M. Speck, New Castle, Del., assignor to Hercules Powder Company, Wilmington, Del., a corporation of Delaware No Drawing. Application August 30, 1955,
Serial No. 531,608

14 Claims. (Cl. 167—33)

This invention relates to new and useful organic thiophosphate compounds and to pesticidal compositions containing the same.

The novel organic thiophosphate compounds of this invention have the general formula

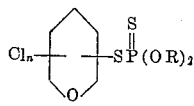

in which each R represents a lower alkyl radical and $n$ represents a number from 2 to 4.

These organic thiophosphate compounds have pesticidal properties and distinguish themselves from known pesticidal compounds in being more toxic at low concentrations toward certain pests and in having a much longer residual toxicity toward mites when sprayed on plants normally attacked by such pests.

The organic thiophosphate compounds of this invention are made by reacting polychlorotetrahydropyran containing 3–5 chlorine atoms with the desired diester of dithiophosphoric acid, the latter being the product of reaction of a lower aliphatic alcohol or a mixture of lower aliphatic alcohols of the formula ROH and $P_2S_5$. The diester of dithiophosphoric acid may be reacted directly with the polychlorotetrahydropyran or it may be reacted in the form of its salt or in the presence of materials which sequester the hydrogen halide set free in the reaction. The term "polychlorotetrahydropyran" as used in this specification refers to a polychlorotetrahydropyran containing 3–5 chlorine atoms.

The methods of making the products of this invention and methods of using the products as pesticides are more particularly described in the following examples in which all parts and percentages are by weight.

Example 1

Trichlorotetrahydropyran in which two of the chlorine atoms are in the 2 and 3 positions, respectively, was prepared by contacting dihydropyran with chlorine gas at about —10° C. until a 2,3-dichlorotetrahydropyran was produced, and then contacting 2,3 - dichlorotetrahydropyran with chlorine gas at about —15° C. until a trichlorotetrahydropyran was produced.

To a stirred solution of 15.8 parts pyridine and 0.2 part hydroquinone in 150 parts benzene was added over a 15-minute period 42.5 parts O,O-diethyl dithiophosphoric acid. To the resulting salt solution was then added 19.0 parts trichlorotetrahydropyran prepared as above. The mixture was then heated at 40–60° C. for 6.5 hours during which time pyridine hydrochloride separated. At the end of this time, water was added to dissolve the water-soluble salts and the organic layer was further purified by washing first with 5% sodium hydroxide solution and then with water. After drying over sodium sulfate, the solvent benzene was removed under reduced pressure and the residue was topped at 85° C./0.5 mm. The residue, which was the diethyl dithiophosphate of dichlorotetrahydropyran-2-thiol, also designated dichlorotetrahydropyran thiol - S - O,O - diethylphosphorodithioate, amounted to 34.0 parts and had the following analysis: S, 21.3%; Cl, 18.4%; P, 10.3%; (calcd. for the designated ester: S, 18.9%; Cl, 20.9%; and P, 9.1%).

An emulsifiable concentrate of the residue was made by mixing 1 gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.00025%. The dispersions were then tested for their toxicity to caged insects and to mites not only by spraying the insects but by spraying the plants alone as well for the purpose of determining residual toxicity. Standard test methods were used for obtaining the results tabulated below.

Tests showed that a 0.05% emulsion of the composition of this example produced a 100% kill of the pea aphids when sprayed on pea plants infested with pea aphids.

Residual activity tests were also run by spraying lima bean seedlings to run off with 0.05% aqueous emulsion and, after drying, infesting with two-spotted mites after varying intervals of time. There resulted 100% mortality to the mites after ten days and 100% mortality after 29 days, the counts being taken five days after the infestation date.

Similar tests on residual activity to Mexican bean beetles with which lima bean seedlings treated at 0.05% concentration were infested showed 100% mortality in two days.

Tests as an insecticide against houseflies showed 100% kill using a 0.05% solution in deodorized kerosene.

Tests against the two-spotted mite showed 100% kill with a 0.025% emulsion.

Example 2

Tetrachlorotetrahydropyran in which two of the chlorine atoms are in the 2 and 3 positions, respectively, was prepared by contacting the trichlorotetrahydropyran, prepared as in Example 1, dissolved in carbon tetrachloride with chlorine gas at about 40° to 60° C. under ultraviolet radiation until a tetrachlorotetrahydropyran was produced. The tetrachlorotetrahydropyran, recovered by distilling of the carbon tetrachloride under reduced pressure, analyzed 63.3% Cl, 26.4% C, 2.7% H and 7.5% O.

To a stirred solution of 6.8 parts sodium ethoxide in 100 parts anhydrous ethanol was added gradually at 30° C. 38.8 parts O,O-diethyl dithiophosphoric acid. To the resulting salt solution was then added 0.2 part hydroquinone and 21.4 parts tetrachlorotetrahydropyran prepared as above. The mixture was then refluxed for 2 hours during which time sodium chloride separated. At the end of this time, water was added to dissolve the water-soluble salts. The organic layer was taken up in 100 parts diethyl ether and further purified by washing first with 5% sodium hydroxide solution and then with water. After drying over sodium sulfate, the solvent benzene was removed under reduced pressure and the residue was topped at 60° C./0.3 mm. The residue, which was the diethyl dithiophosphate of trichlorotetrahydropyran-2-thiol, also designated trichlorotetrahydropyran thiol-S-O,O-diethylphosphorodithioate, was a pale orange oil which amounted to 21.5 parts and had the following analysis: S, 16.1%; Cl, 28.0%; P, 7.9% (calcd. for the designated ester: S, 17.1%; Cl, 28.4%; and P, 8.3%).

An emulsifiable concentrate of the residue was made by mixing 1 gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.00025%. The dispersions were then tested for their toxicity to caged insects and to mites not only by spraying the insects but by spraying the plants alone as well for the purpose of determining residual toxicity. Standard test methods were used for obtaining the results tabulated below.

Tests showed that a 0.025% emulsion of the composition of this example produced a 100% kill of pea aphids when sprayed on pea plants infested with pea aphids.

Residual activity tests were also run by spraying lima bean seedlings to run off with 0.025% aqueous emulsion and, after drying, infesting with two-spotted mites after varying intervals of time. There resulted 100% mortality to the mites after ten days and 100% mortality after 29 days, the counts being taken five days after the infestation date.

Similar tests on residual activity to Mexican bean beetles with which lima bean seedlings treated at 0.025% concentration were infested showed 100% mortality in two days.

Tests as an insecticide against houseflies showed 100% kill using a 0.025% solution in deodorized kerosene.

*Example 3*

Pentachlorotetrahydropyran was prepared by contacting irradiated tetrachlorotetrahydropyran in refluxing carbon tetrachloride with chlorine gas. It was taken as a residue after removal of the solvent under reduced pressure and analyzed 68.1% chlorine compared to a calculated value of 68.6% chlorine.

A stirred solution of 25.8 parts of pentachlorotetrahydropyran, prepared as above, 0.2 part of hydroquinone and 41.6 parts of sodium O,O-diethyl dithiophosphate in 120 parts of absolute ethanol deposited a precipitate of sodium chloride when it was heated at 55° for 4 hours. After cooling, the solid was removed by filtration and the liquid taken up in ether, was washed with 5% sodium hydroxide and water to remove water-soluble materials. The organic layer was dried over magnesium sulfate and the solvent ether removed under reduced pressure. The residue was topped to 70°/0.4 mm. This residue was a red-brown liquid and was the tetrachlorotetrahydropyran thiol - S,O,O - diethyl phosphorodithioate. It amounted to 20.0 parts and had the following analysis: S, 14.5%; Cl, 34.4%; P, 9.4%; $n_D^{20}=1.5443$; (calcd. for the designated ester: S, 15.7%; Cl, 34.8%; P, 7.6%). Toxicity for this product toward insects is tabulated below:

| Insect | Concentration, Percent | Percent, Kill |
|---|---|---|
| Housefly | 0.025 | 92, 96 |
| Mexican Bean Beetle | 0.025 | 100, 100 |
| Pea Aphid | 0.025 | 100 |
| Southern Armyworm | 0.05 | 80 |
| Two Spotted Spider Mite | 0.005 | 100 |

*Example 4*

O,O-diisopropyl dithiophosphoric acid was produced by adding four molecular equivalents of 99% isopropyl alcohol to a suspension of one molecular equivalent of phosphorus pentasulfide (P₂S₅) suspended in benzene while heating under reflux and venting the hydrogen sulfide evolved. The temperature was gradually raised to 100° C. during the course of this addition and heating was stopped when hydrogen sulfide evolution ceased. The product was cooled and filtered and the solvent was removed at 80° C. under 15 mm. pressure.

To 46 parts of O,O-diisopropyl dithiophosphoric acid was added 200 parts benzene, 0.2 part hydroquinone and 15.8 parts pyridine. To the resulting solution was then added 15.7 parts tetrachlorotetrahydropyran prepared as above, and the mixture was refluxed for 6 hours. The resulting product was washed with water and then with dilute alkali, then with water, and finally dried over sodium sulfate. After removal of the benzene by distillation a residue of diisopropyldithiophosphate of trichlorotetrahydropyran thiol amounting to about 36 parts was isolated.

This product was made into an emulsifiable concentrate with benzene and sorbitan monolaurate polyoxyalkylene derivative (Tween 20) and diluted with water to form dispersions of various concentrations. These emulsions were shown to have high toxicity to insects and mites both by contact and by treating plants on which the insects and mites normally live.

*Example 5*

Di-n-propyl dithiophosphoric acid was prepared by the reaction of n-propyl alcohol on phosphorus pentasulfide and was then reacted with tetrachlorotetrahydropyran in benzene solution to produce the di-n-propyl dithiophosphate of trichlorotetrahydropyran thiol. This product was then made into a concentrate with benzene and Tween 20 and diluted to emulsions of various concentrations. These emulsions were shown to have high toxicity to insects and mites both by contact and by treating plants on which the insects and mites normally live.

*Example 6*

Di-sec-butyl dithiophosphoric acid was prepared by the reaction of sec-butyl alcohol on phosphorus pentasulfide and was then reacted with tetrachlorotetrahydropyran in benzene solution in the presence of pyridine to produce the di-sec-butyl dithiophosphate of trichlorotetrahydropyran thiol. This product was then made into a concentrate with benzene and Tween 20 and diluted to emulsions of various concentrations. These emulsions were shown to have high toxicity to insects and mites both by contact and by treating plants on which the insects and mites normally live.

*Example 7*

Dimethyl dithiophosphoric acid was prepared by the reaction of methyl alcohol on phosphorus pentasulfide and was then reacted with tetrachlorotetrahydropyran in benzene solution in the presence of pyridine to produce the dimethyl dithiophosphate of trichlorotetrahydropyran-2-thiol. This product was then made into a concentrate with benzene and Tween 20 and diluted to emulsions of various concentrations. These emulsions were shown to have high toxicity to insects and mites both by contact and by treating plants on which the insects and mites normally live.

The organic dithiophosphate compounds of the formula

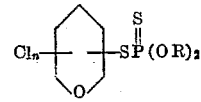

are those in which $n$ is a number from 2–4 and each R is the same or a different organic radical such as a lower alkyl radical: methyl, ethyl, n-propyl, isopropyl, isobutyl, sec-butyl and n-butyl. In the above definition of the scope of the compounds of this invention, "lower alkyl" is defined to include those alkyl radicals of 1–4 carbon atoms. While one chlorine atom is probably in position 3, the other chlorine is in any of the positions 4, 5 and 6. The dithiophosphate group is believed to be in position 2.

The insecticidal activity of the products of this invention is greatest in those of the general formula set forth above wherein R is methyl or ethyl and is greatest when the alkyl group has a low number of carbons. The optimum activity is also found in those compounds in which $n$ equals 3–4.

In producing the compounds of this invention, the reaction between the polychlorotetrahydropyran and the ester of dithiophosphoric acid or its salt is carried out by heating the two reactants at a temperature at which reaction takes place but below the decomposition temperature in the range of 20° to 200° C., preferably in the range of 30° to 110° C. The reactants may be mixed in any desired order. In order to get complete reaction, it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

The reaction is preferably carried out in nonaqueous media. Organic solvents are desirable to aid in control of the reaction. Suitable solvents include benzene, toluene, xylene, cyclohexane, hexane, anhydrous alcohol solvents and dioxane. It is preferable to use hydrocarbon solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the polychlorotetrahydropyran, hydrogen halide which is liberated is preferably sequestered by adding a material to combine with the hydrogen halide as formed. It is convenient to use pyridine for this purpose. However, in its place, other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the polychlorotetrahydropyran as in Example 1. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the polychlorotetrahydropyran, the alkaline material is preferably added gradually as needed but it can be added all at once if desired. Ammonia is suitably added gradually as a gas, the solids are suitably added in finely divided form.

The dithiophosphoric acid ester is produced by reacting the lower aliphatic alcohol, which is to form a part of the ester, with P₂S₅, preferably in a nonreactive solvent such as benzene, toluene, xylene, hexane or cyclohexane, and removing the H₂S which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the polychlorotetrahydropyran.

The methods by which the products of this invention are isolated will vary slightly with the reactants used and the product produced. In some instances, the chloride salt split out in the reaction separates and can be filtered off. In other instances, the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrin, and the like, in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in Aerosol formulations in which difluorodichloromethane and similar Aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of about 10.0% to about 0.0001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient amounts of organic solvents to aid in effective dispersion. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (Donald E. H. Frear, second edition, 1948, pages 280–287) for use with known insecticides and include neutral soaps of resin, alginic and fatty acids and alkali metals or alkylamines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will, in some instances, have more than one surface-active dispersing agent for a particular type of utility, or in addition to a surface-active dispersing agent hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. As a new composition of matter a polychlorotetrahydropyran-thiol-S-O,O-dialkyl phosphorodithioate in which the chlorine amounts to 2–4 atoms and the alkyl groups are lower alkyl groups.

2. As a new composition of matter a polychlorotetrahydropyran-thiol-S-O,O-dimethyl phosphorodithioate in which the chlorine amounts to 2–4 atoms.

3. As a new composition of matter a polychlorotetrahydropyran-thiol-S-O,O-diethyl phosphorodithioate in which the chlorine amounts to 2–4 atoms.

4. As a new composition of matter a polychlorotetrahydropyran-thiol-S-O,O-dipropyl phosphorodithioate in which the chlorine amounts to 2–4 atoms.

5. As a new composition of matter a dichlorotetrahydropyran-thiol-S-O,O-diethyl phosphorodithioate.

6. As a new composition of matter a trichlorotetrahydropyran-thiol-S-O,O-diethyl phosphorodithioate.

7. As a new composition of matter a tetrachlorotetrahydropyran-thiol-S-O,O-diethyl phosphorodithioate.

8. An insecticide comprising the composition of claim 1 and an insecticidal adjuvant.

9. An insecticide comprising the composition of claim 2 and an insecticidal adjuvant.

10. An insecticide comprising the composition of claim 3 and an insecticidal adjuvant.

11. An insecticide comprising the composition of claim 4 and an insecticidal adjuvant.

12. An insecticide comprising the composition of claim 5 and an insecticidal adjuvant.

13. An insecticide comprising the composition of claim 6 and an insecticidal adjuvant.

14. An insecticide comprising the composition of claim 7 and an insecticidal adjuvant.

References Cited in the file of this patent

UNITED STATES PATENTS

| | | |
|---|---|---|
| 2,725,327 | Diveley | Nov. 29, 1955 |
| 2,725,331 | Haubein | Nov. 29, 1955 |
| 2,725,333 | Buntin | Nov. 29, 1955 |